(12) United States Patent
Alliot et al.

(10) Patent No.: US 7,908,732 B2
(45) Date of Patent: Mar. 22, 2011

(54) METHOD OF AND APPARATUS FOR INTERCONNECTING LINED PIPES

(75) Inventors: Vincent Marcel Ghislain Alliot, Paris (FR); Jean Louis Hoss, Aberdeen (GB)

(73) Assignee: Stolt Offshore S.A., Nanterre, Cedex (FR)

( * ) Notice: Subject to any disclaimer, the term of this patent is extended or adjusted under 35 U.S.C. 154(b) by 1444 days.

(21) Appl. No.: 10/523,747

(22) PCT Filed: Aug. 1, 2003

(86) PCT No.: PCT/EP03/09305
§ 371 (c)(1),
(2), (4) Date: Jun. 20, 2005

(87) PCT Pub. No.: WO2004/015321
PCT Pub. Date: Feb. 19, 2004

(65) Prior Publication Data
US 2005/0246883 A1 Nov. 10, 2005

(30) Foreign Application Priority Data

Aug. 2, 2002 (GB) .................................. 0217937.2

(51) Int. Cl.
*B21D 39/00* (2006.01)
*B23K 37/00* (2006.01)
*F16L 9/14* (2006.01)
(52) U.S. Cl. .............. 29/523; 29/507; 228/44.5; 285/55
(58) Field of Classification Search .................... 29/523, 29/522.1, 507; 285/53, 55, 258, 370, 382.4; 228/44.5, 49.3
See application file for complete search history.

(56) References Cited

U.S. PATENT DOCUMENTS

| 3,499,666 A | * | 3/1970 | Turner .......................... 285/55 |
| 3,508,766 A | * | 4/1970 | Berg et al. .................... 285/21.1 |
| 4,357,745 A | * | 11/1982 | Chlebowski .................... 29/460 |
| 4,883,292 A | | 11/1989 | Kuroki |

(Continued)

FOREIGN PATENT DOCUMENTS

| DE | 8813893 | 1/1989 |
| EP | 0 617 220 A1 | 9/1994 |
| EP | 0 722 824 A3 | 3/1999 |
| GB | 2186340 | 8/1987 |
| GB | 2298256 | 8/1996 |

OTHER PUBLICATIONS

Performance Review—Swage Lining—Advantica—1985 (9 pages).

(Continued)

*Primary Examiner* — Essama Omgba (57) ABSTRACT

There are disclosed methods of and apparatus for interconnecting lined metal pipes (110, 120), applying in particular to the offshore oil and gas industry. Corrosion is a common problem in the industry. Lining pipes overcomes the problem, but welding sections of pipe together can be a complicated and time-consuming task, requiring dedicated and sophisticated tooling. More desirable is the ability to use conventional pipe-laying equipment (20, 40, 50, 60, 70, 80, 90) with little additional tooling. As such, there are disclosed methods and apparatus compatible with known offshore connection methods, particularly where the spacing of joints on the pipe is less than 100 m. The chosen technique will not significantly impact the laying rate of the lined pipe, compared with unlined pipe. The method includes connecting lined pipes (110, 120) using a corrosion-resistant bridging member (102) internally overlapping both linings, leaving a void space (146) behind the weld region (109) while at least the initial stages of welding (180) are performed, and expanding (170) the bridging member to provide a seal against the liners, in a controlled sequence. There is also disclosed a bridging member (102), tooling (170) and pipelay apparatus suitable for use with this method.

20 Claims, 7 Drawing Sheets

U.S. PATENT DOCUMENTS

| | | | |
|---|---|---|---|
| 5,009,002 A * | 4/1991 | Kelly | 29/890.031 |
| 5,014,779 A * | 5/1991 | Meling et al. | 166/55.7 |
| 5,348,211 A * | 9/1994 | White et al. | 228/120 |
| 5,547,228 A * | 8/1996 | Abbema et al. | 285/22 |
| 5,566,984 A | 10/1996 | Abbema et al. | |
| 5,975,802 A | 11/1999 | Willis | |
| 5,992,897 A * | 11/1999 | Hill et al. | 285/55 |
| 6,213,686 B1 | 4/2001 | Baugh | |
| 6,226,855 B1 | 5/2001 | Maine | |
| 6,719,186 B2 * | 4/2004 | Mudge et al. | 228/215 |
| 7,243,409 B2 * | 7/2007 | Lewis | 29/469 |
| 7,290,605 B2 * | 11/2007 | Waddell et al. | 166/207 |
| 7,344,161 B2 * | 3/2008 | Howard et al. | 285/48 |
| 7,431,341 B2 * | 10/2008 | McIntyre | 285/53 |
| 7,722,085 B2 * | 5/2010 | Pionetti | 285/55 |

OTHER PUBLICATIONS

Swagelining advertisements (4 pages).

Deepwater Production—Foinaven Field Injection Lines Swage-Lined for Special Conditions—Offshore—1996 (18 pages).

* cited by examiner

METHOD OF AND APPARATUS FOR INTERCONNECTING LINED PIPES

This invention relates to methods and apparatus for interconnecting metal pipes lined with plastic or other deformable corrosion-resistant lining material. The invention finds particular application in the offshore oil and gas industry, but is not limited to such applications.

Steel pipes are commonly used for the transport of fluids of different types in the offshore industry. When conveying oil and gas, corrosion is a limited problem. Offshore field operators also need to transport more corrosive fluids, in particular seawater for pumping water into a water injection well head. The invention is not limited to application for water injection, or to offshore applications. Experience shows that water injection pipe suffers from rapid degradation due to corrosion of the steel pipe. In order to provide a suitable service life when using unprotected steel pipe, the wall thickness would have to be significantly increased, making it heavier, more expensive and more difficult to install, especially in deep water. A very expensive solution would be to use corrosion-resistant metal, such as Inconel™ or stainless steel. Alternatively, steel pipe with internal thermoplastic liner can be used, satisfying both weight and cost budgets.

When using lined pipe for offshore applications, the lined pipe is typically fabricated on shore using the Swagelining™ technique, as described for example in United Kingdom patent GB 2186340. A slightly oversized liner pipe made of thermal plastic material is pulled through the pipe using a reducing die. Once the pulling operation is completed and the pulling tension released, the liner over a period of time progressively returns to its original shape, locking itself inside the steel pipe. Single lengths of pipe over 1000 m in length can be pre-fabricated and lined by this technique. If longer pipes are required, sections of lined pipe are then interconnected using the Weldlink™ welding process, as described in GB 2298256. This process consists of swaging a corrosion-resistant sleeve to terminate each pipe section and then welding both the sleeves and pipe materials using dedicated welding procedures and welding equipment. Multiple welding operations are required for each pipe section being joined. The time taken for these operations is best measured in hours, but this is not prohibitive when joints are being made only once every kilometer or more.

Using these known techniques to produce offshore pipe requires setting up a dedicated fabrication, assembling and reeling base. A reel laying spread is also required to transport and lay the pipe offshore. In some circumstances this technique is not commercially attractive due to the costs associated with setting up the base and the limitation of the reel lay vessel (storage capacity, laying tension). As an alternative the pipe could also be bottom-towed to the offshore field after being assembled and fabricated. However this technique also has severe limitations, such as crossing of existing pipe and complications caused by the nature and profile of seabed.

To construct a continuous pipeline it would, ideally, be possible to use existing offshore pipe laying techniques, such as S-Lay or J-Lay, which fabricate a continuous pipeline from a large number of shorter steel pipe sections, on board a pipe laying vessel. The pipe sections then would be pre-lined with lengths of thermoplastic liner. U.S. Pat. No. 5,975,802 (Willis) and U.S. Pat. No. 6,213,686 (Baugh) describe two different pipelaying systems of this kind. In US '802, a series of welding and test stations, spaced along the deck of a pipe laying vessel, operate in parallel to build the pipe rapidly from single sections. The welded pipe is then bent upwardly and then downwardly to be launched into the sea at the desired angle. In more conventional J-Lay processes, such as that described in US '686, double or quadruple pipe sections are pre-fabricated, and then up-ended in a special tower structure, to be welded onto the end of the pipe as it is paid out. Such systems are highly developed and each section can be aligned, welded, tested and paid out in a matter of minutes.

As noted above, due to the complexity of the pipe fabrication and welding procedure, the time for interconnecting each new section of lined pipe by the known Weldlink™ technique can be measured in hours, lather than minutes. As a consequence, the method is not commercially compatible with the known techniques for laying steel offshore pipe, which involve welding in relatively rapid succession much shorter pipe sections at the field, thus forming a continuous pipe.

Another proposal for joining lined pipes is described in U.S. Pat. No. 6,226,855 (Lattice), which uses a specially-formed corrosion-resistant tubular bridging member, swaged internally to seal to the liner on either side of the joint. The steel pipe sections are then welded directly to one another. This is simpler than the Weldlink™ technique, requiring only a single weld per joint, but is not available as a commercial process, and a number of issues remain to be resolved. In particular, the bridging member of US '855 has an intermediate section which is of increased outer diameter and of thicker material. This intermediate section apparently acts as a backing ring to the weld. Backing rings will in general be imperfectly welded to the pipe metal, and therefore the metal behind the weld is prone to corrosion, particularly because the ring is of different material to the pipes being welded. Some engineers also believe backing rings cause stress concentration. Experiments would also be required to determine how parameters of the highly-developed and automated welding processes would have to be adjusted to take account of the presence of the backing ring as a beat sink. There is also the problem that the bridging member will conduct welding heat into the plastic liner, damaging it. US '855 proposes a second embodiment having a heat-barrier ring behind the weld, but this only increases the complexity of the construction. Finally, the junction between the sealing portions and the thicker intermediate portion may be a source of weakness, under the forces applied during the swaging process.

Considering the foregoing matters, it is an object of the invention to provide a method of and apparatus for interconnecting lined pipes that is compatible with known offshore connection methods, particularly where the spacing of joints on the pipe is less than 100 m. Ideally, the chosen technique will not involve any reduction in the laying rate of the lined pipe, compared with unlined pipe.

In accordance with a first aspect of the present invention, there is provided a method of joining plastic-lined conduits comprising the following steps, not necessarily in the following order:
  providing a first conduit and a second conduit, each conduit comprising a wall of metal defining a bore having an open end for connection and being substantially lined by a plastic liner, the liner ending within the bore to leave a short unlined section at the open end of the conduit;
  arranging said first and second conduits with their ends abutting;
  welding said ends together to form a longer conduit;
  providing a tubular bridging member of corrosion-resistant material dimensioned to fit inside the lined conduits, the bridging member having a first sealing portion toward one end thereof and a second sealing portion toward the second end, said sealing portions being interconnected by an intermediate portion, the length of said intermediate portion being sufficient to bridge the unlined portions of the abutting first and second conduits while the first and second sealing portions overlap said liners within the first and second conduits respectively;

with the first sealing portion of the bridging member located within the first conduit and overlapping the liner, expanding said first sealing portion radially so as to press the first sealing portion against the liner to form a first seal between the liner and the bridging member; and with the second sealing portion of the bridging member located within the second conduit and overlapping the liner of the second conduit, expanding said second sealing portion radially so as to press the second sealing portion against the liner to form a second seal between the liner and the bridging member, whereby the liners, the first and second seals and the bridging member form a continuous barrier between the interior bore of the lined conduits and the metal of the conduit walls, wherein the dimensions of the bridging member and the sequence of the method steps are such that the material of the bridging member is not located against the inside of the abutting ends of the conduits during at least an initial pass of said welding step.

In a preferred embodiment, the ends of the lined conduits are brought together before the bridging member is introduced to said conduits at the location of the abutting ends.

In this case, the bridging member may be installed via the second conduit and subsequently expanded, after the conduits have been welded together.

The bridging member may be present behind the abutting ends of the conduits prior to starting said welding step, or may be introduced after at least an initial pass of welding has been completed. (Welding is conventionally performed by a "root pass" and several further passes for filling and capping the weld.)

In the case where the bridging member is present at the start of welding, the outer diameter of the bridging portion is sufficient to leave a substantial gap behind the abutting ends.

In the alternative case where the bridging member is introduced behind the weld location after the welding has started, the outer diameter of the bridging member is sufficient to allow free passage of the bridging member longitudinally through the lined portions of the conduits.

In alternative embodiments, the bridging member is fitted to the first lined conduit and the first sealing portion is expanded to form said first seal, with said second sealing portion and part of the intermediate portion remaining outside the first conduit, before the ends of the first and second conduits are brought together. Following these steps it is possible to fabricate pipe sections with bridging member pre-fitted, to reduce the number of steps performed at sea.

The method may further comprise, at a time after said first pass of welding and after introducing the bridging member at the location of the abutting ends, expanding the intermediate portion of the bridging member radially so as to substantially eliminate said space. Doing so minimizes the quantity of corrosive fluid, such as air or sea water, retained within the region, thus maximizing the life of the weld. The expanding of said intermediate portion may be performed prior to expanding the first and second sealing portions, to allow escape of the trapped fluid.

The expanding of any of said intermediate portion and first and second sealing portions may be performed concurrently with subsequent passes of welding.

Expansion of said first and second sealing portions may be provided by a single tool comprising first and second means for radial expansion of said sealing portions.

Said tool may further comprise means for radial expansion of said intermediate portion. The expanding of said intermediate portion may be performed by fluid injection into the region between said first and second radial expansion means. The first and second expanding means may be operated with a restricted force to serve as sealing means during said fluid injection.

The bridging member and expansion means may be introduced together into the conduit and located adjacent said abutting ends. The expansion means may be operated with restricted force to engage the bridging member mechanically to carry it to the desired location.

This allows a combined step of locating the bridging sleeve and swaging tool between two sections of newly-welded pipe, bridging internally between both liners, and expansion of the sealing portions to effect a complete seal.

The bridging member may be fabricated out of corrosion-resistant metal, for example Inconel™, or from a non-metallic material.

At least one formation may be provided on each sealing portion to improve grip between the bridging member and the liner. In a preferred embodiment, each sealing portion is provided with a series of circumferential formations. Alternatively, adhesive may be used.

The end of the bridging member may be chamfered to aid insertion of the bridging member into the lined conduit.

At each end to be joined the liner end face may be chamfered to reduce its cross-sectional area. This can aid the process of introducing the bridging member into the liner, and also reduces stress in the material of the bridging member in embodiments where the intermediate portion is expanded over the end of the liner.

The first and second conduits may be joined as part of an offshore pipe fabrication and laying process, each conduit being a section of pipeline added in turn to the pipeline being laid by repeating the steps of the method as set forth above. The sections may be less than 100 m long, requiring a relatively large number of joining operations, but overcoming the disadvantages associated with handling lengthy pipe sections, hundreds or even thousands of meters long.

The first conduit may be either the pipe section joined already to the pipeline, or may be the one being added. In the first case, the second conduit becomes the first conduit after the second conduit has been interconnected with the first conduit. In the second case, the second conduit becomes the first conduit after interconnection.

The joining method may be performed while the first and second conduits are substantially horizontal, the assembled pipeline being bent first upwardly and then downwardly for entry into the sea.

Alternatively, the joining method may be performed while the first and second conduits are inclined at an angle for entry into the sea. In a J-Lay vessel, where the pipe sections are paid out using a travelling clamp in an inclined tower, the expanding may be performed by a swaging device mounted in the head of the tower.

In accordance with the preferred embodiment mentioned above, the bridging member may be introduced at the location of the abutting ends after the first and second conduits have been brought together.

The bridging member may be carried to the location of the abutting ends by means of an expanding tool, which engages the inside of the bridging member by friction. The expanding tool may comprise expanding means operated so as to engage the bridging member with restricted force to carry it to the location of the abutting ends, and then with greater force to perform the expanding step of the sealing portions.

In such an embodiment, the expanding tool is preferably provided with first and second expanding means, spaced to coincide with the first and second sealing portions, the carrying step and expanding of the first and second sealing portions being performed without disengaging the tool from the bridging member.

Alternatively, a single expanding means may be moved longitudinally to expand different portions of the bridging member sequentially.

In alternative embodiments, the bridging member may be introduced to the first conduit, and the first sealing portion expanded prior to elevation of the first conduit to said angle. This saves time at the welding station, and may also prevent the bridging member falling into or out of the pipe during elevation. Alternatively, the bridging member may be held in position initially by some sort of gripping device until it is held in place after expanding.

Bridging members may be introduced to a plurality of lined conduit sections, prior to joining any two of the conduits together. The associated sealing portion may also be swaged at the same time. This can be performed for all pipe sections at a yard onshore if desired, and will save time at the welding station. Protective caps or collars can be applied, to prevent damage to the projecting parts of the bridging member, for storage and transit.

The invention in a further aspect provides a tubular bridging member adapted for use in the connecting method according to the invention as set forth above.

The invention yet further provides an expansion tool adapted for use in the connecting method according to the invention as set forth above.

In accordance with a further aspect of the present invention, there is provided an expansion tool operable for expanding at least one portion of a bridging member for joining plastic-lined conduits, said tool comprising at least two means for radial expansion held at a longitudinal separation along the axis of the conduits, dimensioned to fit into said bridging member prior to expansion, each said expansion means operable with at least one selectable expansion pressure, said tool further comprising a means for conveying the tool to its desired location, in use. Said conveying means may be a main tether from which the tool is suspended under the influence of gravity, or an elongate member for locating the tool within the conduits, where gravity cannot be used to pass the tool through said conduits.

The expansion tool may further comprise a means for radial expansion of a portion of said bridging member located between said expansion means and may comprise fluid injection into the region between said expansion means. Said fluid may be transported to said tool via a pipe of smaller diameter than the lined conduits, or via a pipe within the main tether.

Each said expansion means may be operated singly, or concurrently with at least one other expansion means, in any combination.

The invention yet further provides a pipe laying apparatus adapted for joining lined pipes by a method according to the invention as set forth above.

The invention yet further provides a pipe laying apparatus including an expanding tool according to the invention as set forth above.

The invention yet further provides in combination a plurality of lined metal pipe sections and a corresponding plurality of bridging members suitable for use in assembling a pipeline by a method according to the invention as set forth above.

BRIEF DESCRIPTION OF THE DRAWINGS

Embodiments of the invention will now be described, by way of example only, by reference to the accompanying drawings, in which.

DETAILED DESCRIPTION OF THE EMBODIMENTS

The system according to the present invention facilitates the offshore assembly of prefabricated field joints with internal liners, in a manner compatible with field-proven techniques of pipeline assembly for S-Lay or J-Lay. Furthermore, this method and apparatus for interconnecting lined pipes is designed in such a way that it would not impact the laying rate of S-Lay or J-Lay spread. It also does not necessitate the establishment of a fabrication base on shore. In addition, using pipe reeling often requires an increase in wall thickness of the pipe to accommodate the anticipated strain. The technique of the present invention, however, allows using thinner pipe, substantially reducing procurement costs.

The interconnection process of the present invention to be described is an adaptation of the existing welding process developed for welding pipe field joints in S lay or J lay mode. Single, double or multiple pipe sections with the internal liner already fitted are pre-fabricated onshore, or on-deck. The sections may be pre-installed with components used during the assembly process, or the components may be provided separately. The sections and other required components are then shipped out to the offshore site, where they are assembled to form a continuous pipeline.

Figure 1:
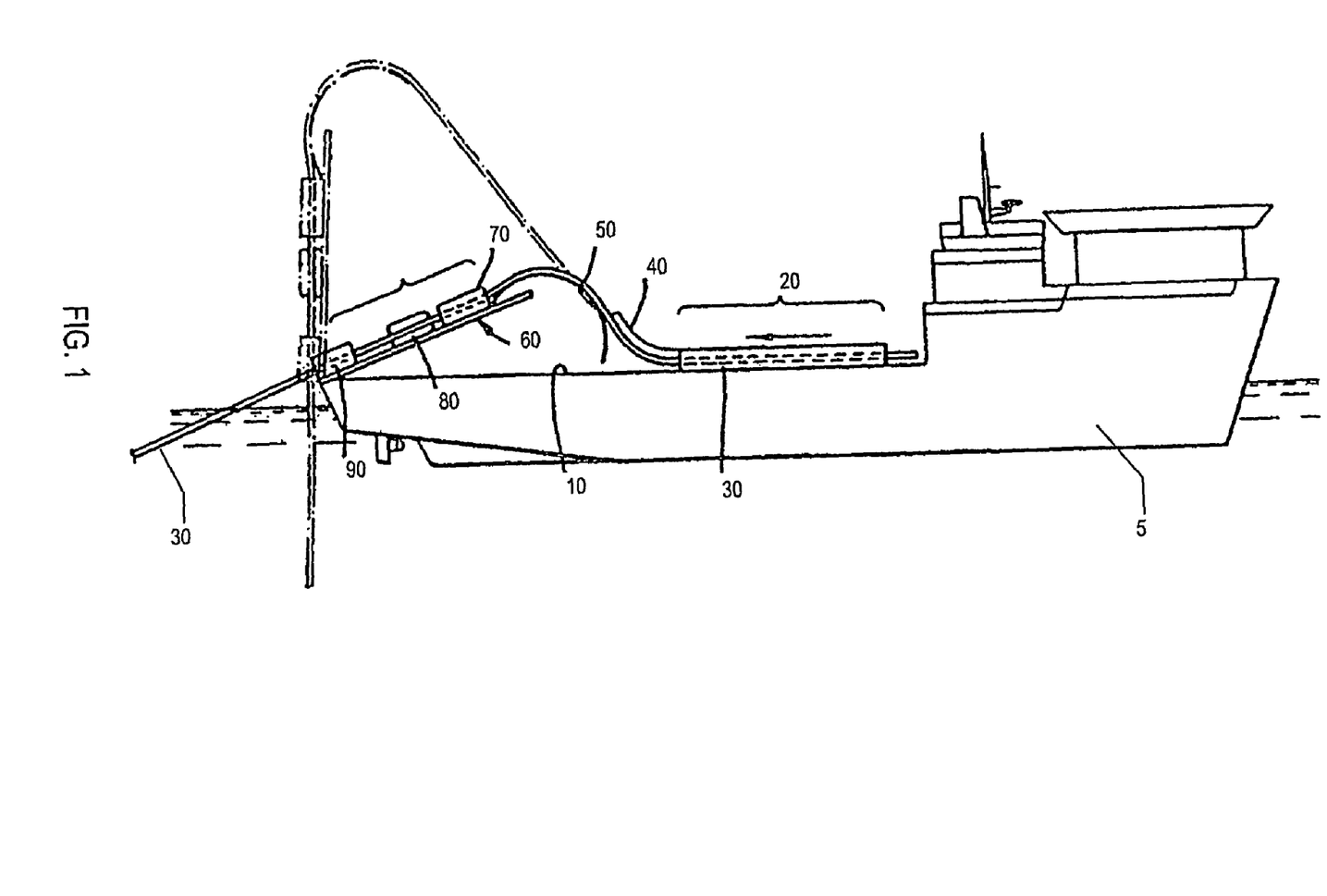
FIG. 1 shows a pipe laying vessel suitable for adapting to the existing pipe joining methods of the present invention.

FIG. 1 shows, for the sake of example only, a known pipe laying vessel upon which the novel process may be employed. This vessel corresponds to that described in U.S. Pat. No. 5,975,802 (Willis), mentioned above. The invention may equally be applied in a J-Lay type vessel such as that described in U.S. Pat. No. 6,213,686 (Baugh). The vessel 5 has a deck 10, on which is mounted a pipe line assembly arrangement 20, comprising the lined pipe interconnection system, and various coating and testing stations, for assembling a continuous pipeline from a stock of pipe segments. Pipe 30 formed in this way progresses in the direction of the arrow, over first and second radius controllers 40, 50. A tiltable ramp 60 is provided for launching the pipe over the stern of vessel 5. In solid lines, ramp 60 and other equipment are shown in a near-horizontal orientation, appropriate to lower water depths. In chain-dotted lines, the same components are shown in a steeply elevated orientation. The radius controllers 40 to 50 guide the pipe and restrict bending within set limits, according to the angle of the ramp 60. On ramp 60 there are mounted various pipe handling devices, such as straightener 70, tensioning and paying-out device 80 and fixed clamp 90. Sections of pipe for joining are stored in the hold of the vessel. Continuous lined pipe is formed by joining sections of pipe using the apparatus and method of interconnection.

The vessel is provided with swaging apparatus (not shown in FIG. 1) for interconnecting lined pipes on the vessel, by the methods that will now be described in detail, with reference to the accompanying diagrams. The swaging tool will be based at the forward end of the assembly arrangement 20, from where it can be threaded into the open end of the pipe, and down to the location of a joint between sections. In a vertical tower (J-Lay) arrangement, such as that of U.S. Pat. No. 6,213,686, the swaging tool can be housed in an "attic" area at the top of the tower, to be lowered into the open end of an erect pipe section.

Figure 2:
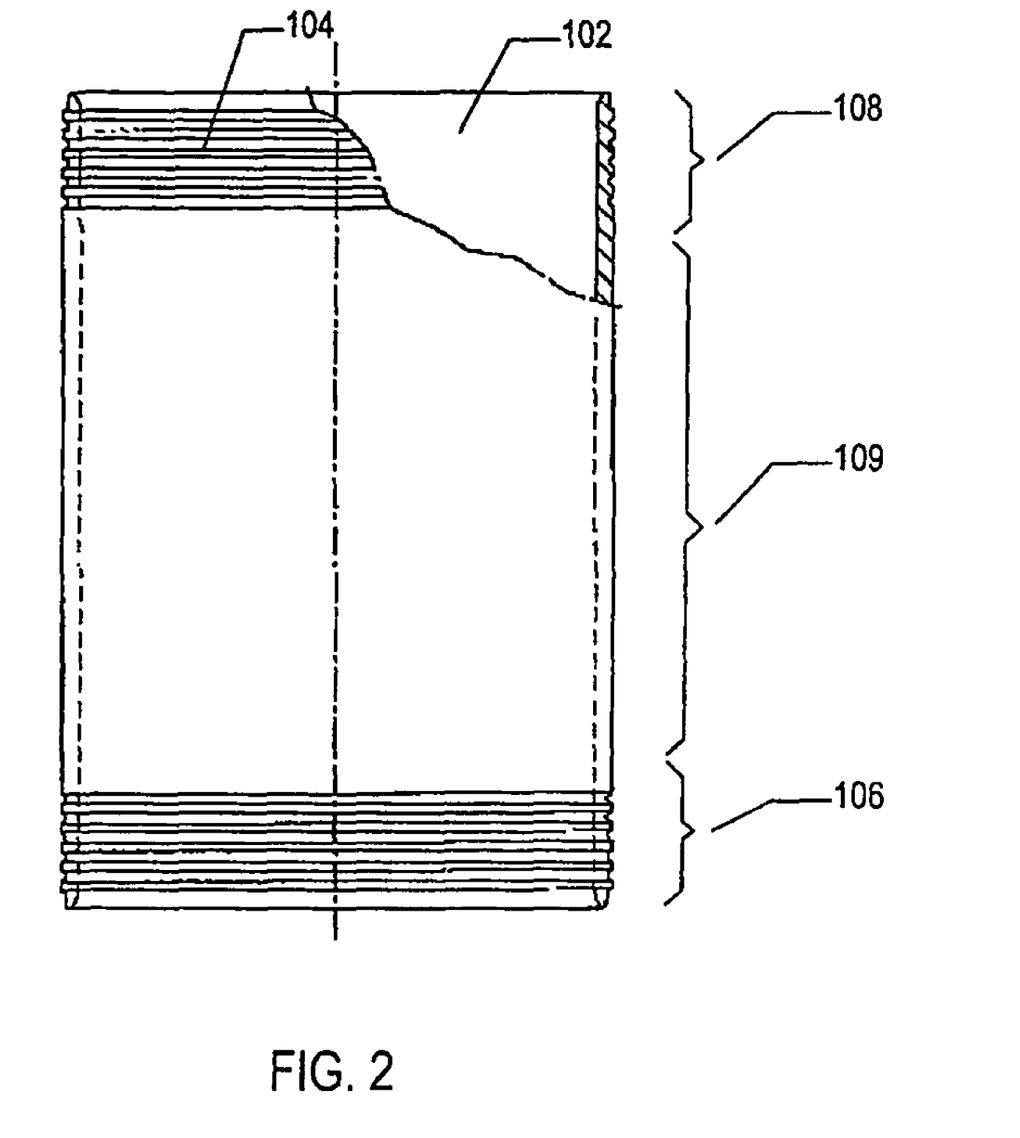
FIG. 2 is a cut-away diagram of a tubular bridging sleeve of a first embodiment of the present invention, used to bridge internally between two sections of lined pipe being interconnected.

FIG. 2 is a cut-away diagram of a tubular bridging sleeve 102, used to bridge internally between two sections of lined pipe being interconnected. It comprises a hollow cylindrical tube with a smooth interior surface of substantially equal bore, and a modified exterior surface, modified to enhance the seal between the sleeve and a liner, when fitted. Such modifications comprise a number of circumferential channels 104, grouped at each end. The recesses are used to maximize the efficiency of the seal and to enhance the grip between liner and sleeve. The sleeve therefore has three definable regions, these being a) at a first end, a first sealing portion 106 having multiple circumferential channels, b) at the other end, a second sealing portion 108 having multiple circumferential channels and c) an elongate intermediate portion 109, interconnecting the two sealing portions. The sealing portions and their channels are described in detail, later in the document.

As part of the sleeve will be exposed to the fluid being transported, it needs to be fabricated from a corrosion-resistant material. A typical choice of material might be Inconel™ or stainless steel, however the skilled reader will appreciate that the choice of material is not limited to metals, but to any material providing the required physical attributes.

Connecting Process—First Embodiment

Figure 3:
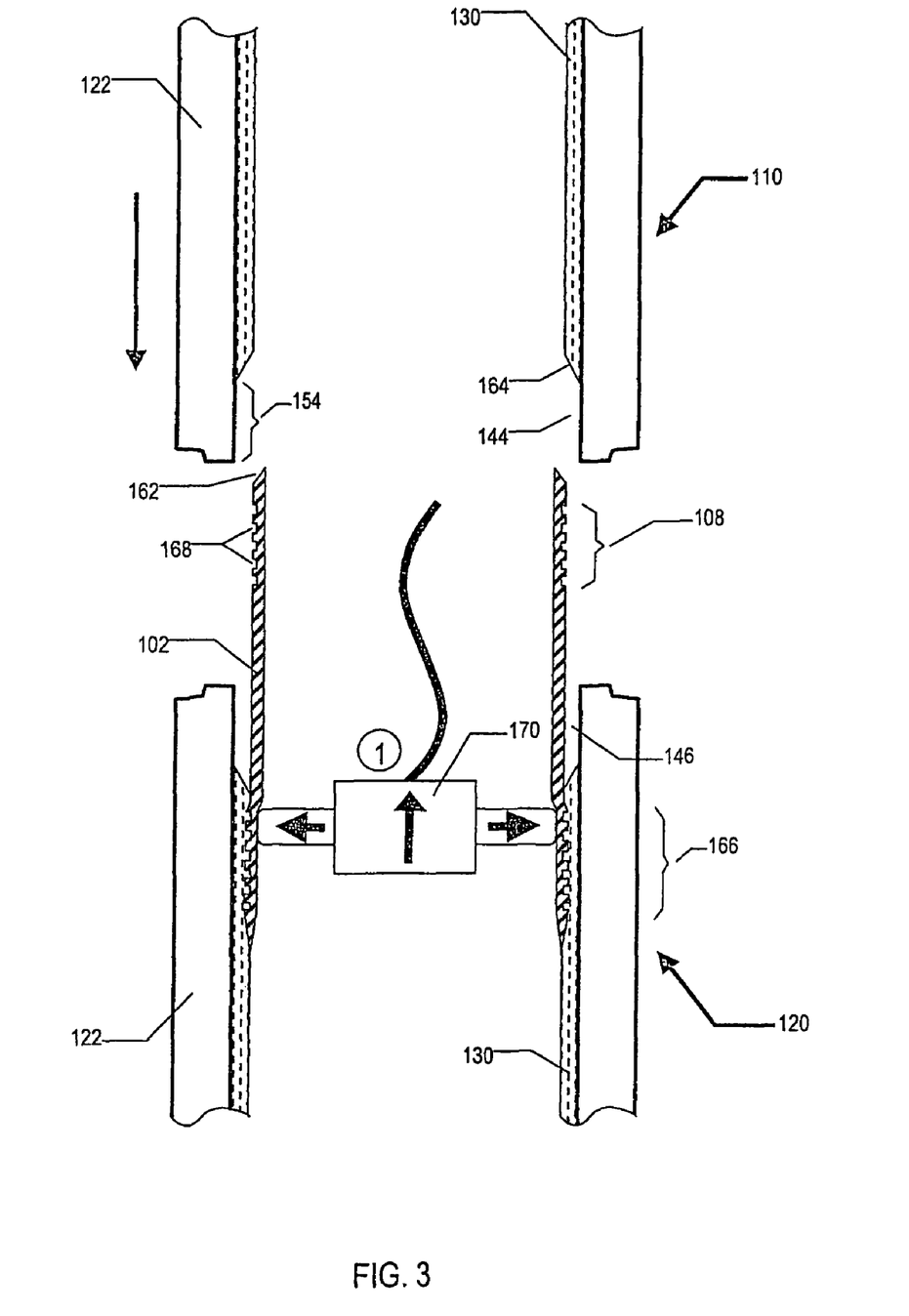
FIG. 3 is a schematic cross-sectional diagram showing initial steps of a method of pipe joining of the first embodiment of the present invention, employing the bridging member of FIG. 2.

FIG. 3 is a schematic cross-sectional diagram of two prepared lined pipe sections 110, 120 being brought together for assembly with the bridging sleeve 102. Preparation involves operations that can effectively be performed on-shore, such as lining, end-beveling and finishing sections of pipe.

The pipes 110, 120 are typically 6" (~150 mm) or greater in diameter, having a grade range of X52 to X65 and a wall thickness of at least ½ (~12 mm). The liner material is a plastic material, such as polyethylene or polyvinylidene fluoride, of HDPE/PE100 quality, of a thickness of at least 8 mm. The liner 130 exhibits a thermal expansion of approximately 0.18 mm/m/° C. and maximum operational temperature of approximately 80° C. Service conditions for the lined pipe are a maximum external pressure of approximately 200 bars and maximum internal pressure of approximately 345 bars. A typical fluid conveyed by the pipe would be deoxygenated seawater $O^2$<5 ppb plus biocides batch injections.

A section 110 of pipe is mid-way through the process of being connected to a continuous pipeline 120, formed out of previously assembled sections of the same. As can be seen, the outer, steel pipe 122 is of continuous diameter, although the skilled person will appreciate that this is not critical to the operation or efficacy of the present invention, applying equally to pipe including a widened end region, where the bore of the pipe is enlarged (not shown). Both ends of the pipe section are shaped in the same way, unless items other than pipe sections are being fitted, such as pipe ends or flanges. The pipe section 110, 120 has been pre-lined with a plastic liner 130. The lining is dimensioned when fitted to contact the inner surfaces of the pipe, with the exception of an unlined region 144, approximately 120 mm from the ends to be welded, which distances the liner from the region where high weld temperatures would permanently and detrimentally modify the characteristics of the liner. As a result, with a sleeve in place an annular void region 146 behind the weld is formed by the combination of gaps either side of the weld. This void region ensures that there is no material behind the weld region whilst the hot phase of the welding is being performed, thus providing the aforementioned advantages. The unlined distance 144 can be reduced where a quicker welding time is used, as less heat is put into the weld region. The converse applies.

The two sections of pipe 110, 120 are interconnected by insertion of the single additional bridging sleeve 102, bridging between the internal surfaces of the liners of both pipe sections. Prior to fitting, the profiles of the inside and outside diameters of the sleeve are substantially constant and cylindrical. The ends 162, 164 of the bridging sleeve 102 and liner 130 are beveled to ease insertion of the bridging sleeve into the bore of the liner, although the skilled person will appreciate that only one of either needs to be beveled, to achieve substantially the same effect. The sleeve and liners are dimensioned such that the sealing portions 106, 108 are adjacent the internal surfaces of both liners, when fitted.

In order to keep the fluid being transported from contacting any of the susceptible steel pipe there is required a fluid-tight seal between the contacting surfaces of the plastic liner 130 and the sleeve 102. This is achieved by swaging the sealing portions 106, 108 of the sleeve onto the liner, adjacent to a region 166 where both liner and sleeve are co-located, and which upon expansion of the sleeve by deformation forces the surfaces of the sleeve and plastic pipe together, thus forming a fluid-tight seal and ensuring that the liner is locked in its intended location. Upon application of pressure the grooves gradually bite into the liner, providing a gradual increase in resistance as force is applied. The grooves allow expansion to proceed in a gradual, controlled manner using force feedback and closed-loop control. Doing so is more effective at providing a good seal between liner and sleeve. The liner is unable to move with respect to the steel pipe because it is gripped at both ends. When the liner is compressed by the swaging process the plastic deforms some way into circumferential channels 104. Doing so hinders any longitudinal movement of the pipe liner with respect to the sleeve, firmly capturing the liner in its intended location.

The detailed form of the grooves may be the same, for example, as that described in GB 2298256, mentioned in the introduction. The skilled person will appreciate that different methods may be equally effective for adhering the contacting surfaces to each other, such as adhesives.

It is possible to have a lined section of pipe pre-fitted with a sleeve of the first embodiment. In this instance each section of pipe is provided pre-fitted with the liner 130 and bonded sleeve 102, thereby minimizing the number of operations per section performed offshore. In principle, two bridging members could be fitted into both ends of each pipe in half of the pipe sections, while the remainder of the pipe sections are left with two open ends. It will generally be preferable to treat each section identically, however, rather than treat different sets of sections differently. This preferred approach is adopted for the following illustration.

Figure 4:
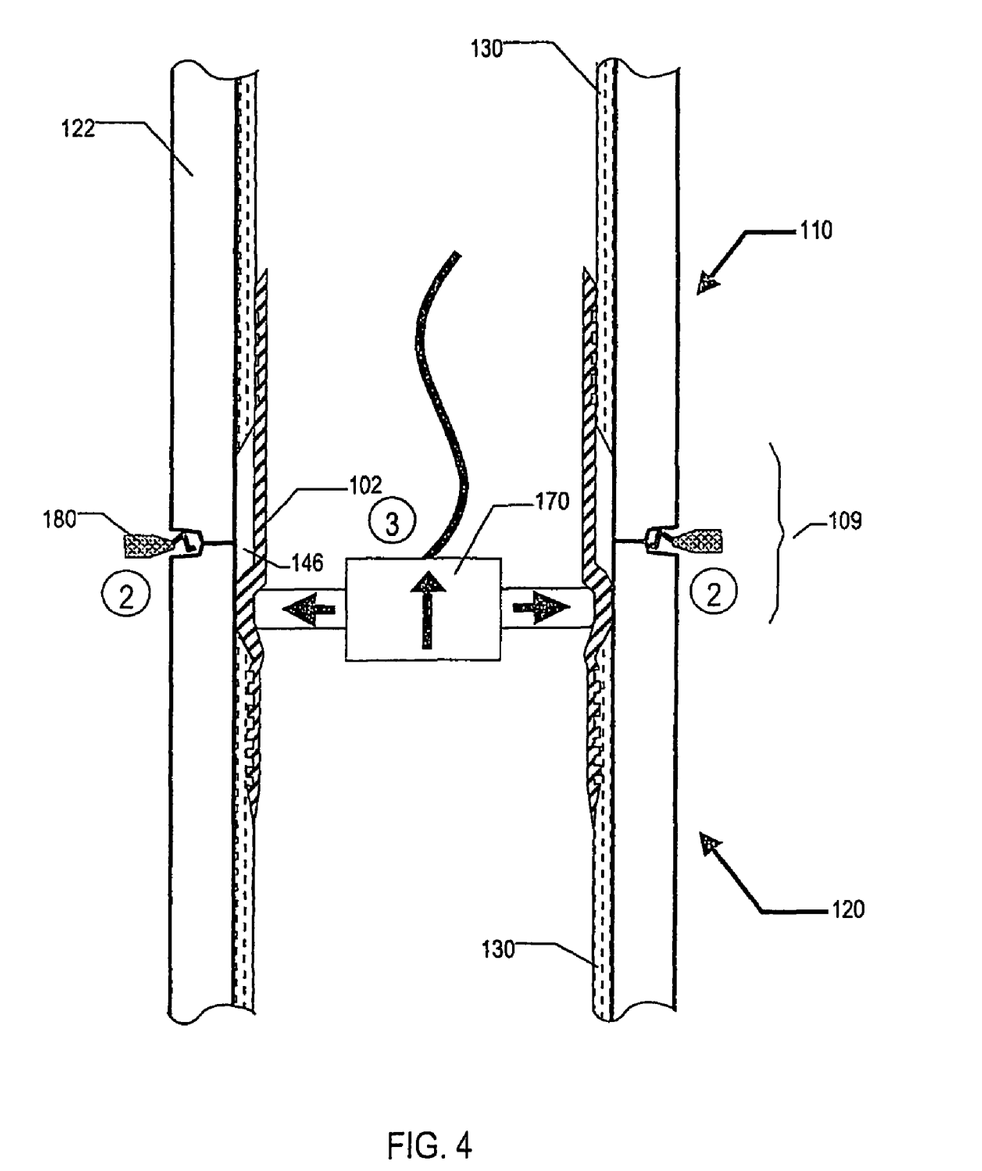
FIG. 4 shows intermediate steps involved in joining the two pipes together using the apparatus described with reference to FIGS. 2 and 3.
Figure 5:
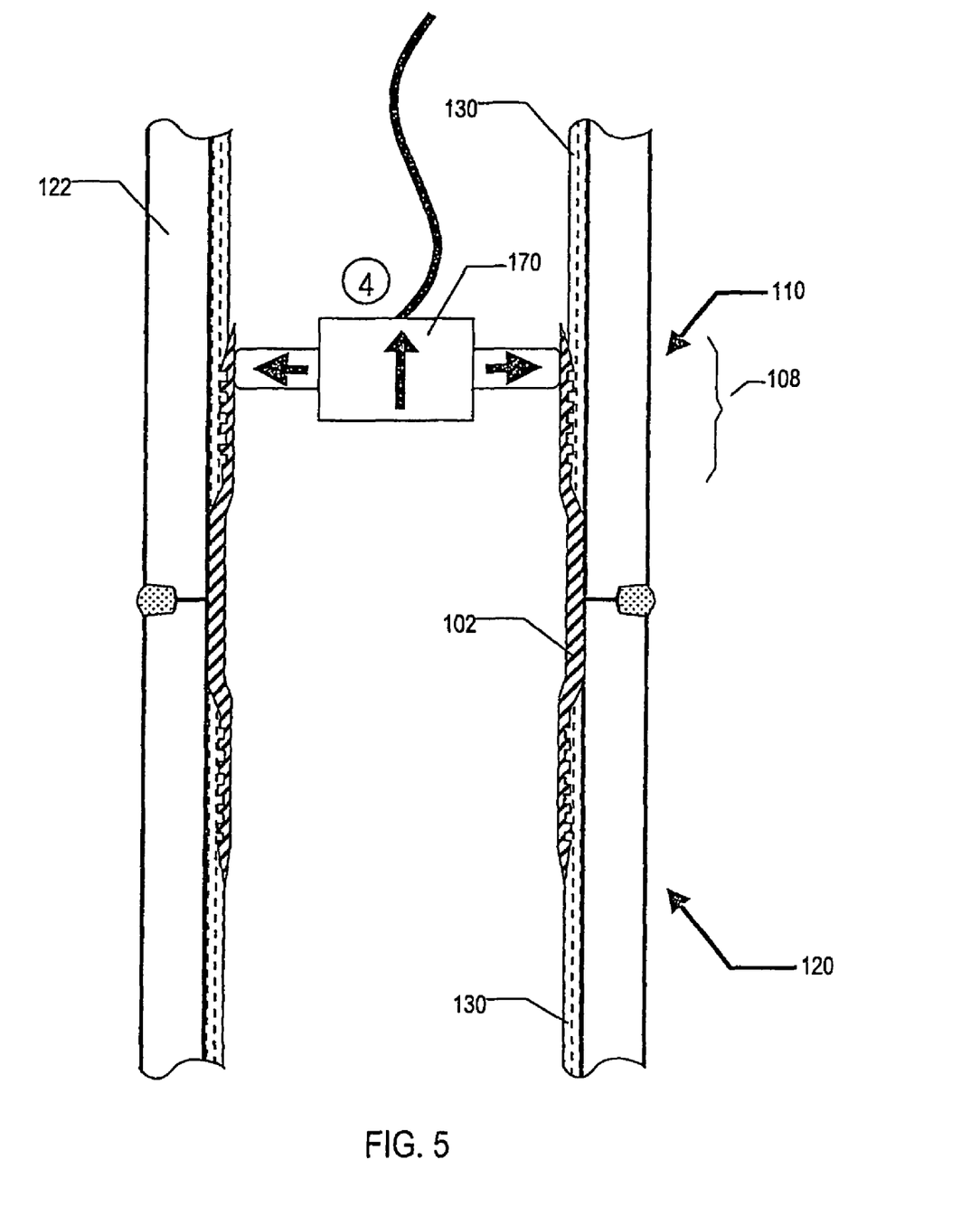
FIG. 5 shows the final steps involved in joining the two pipes together using the apparatus described with reference to FIG. 2 to 4.

All of the components necessary for joining two pipe sections together have now been described. Pipe interconnection is consequently achieved in accordance with the following procedure and with reference to FIGS. 3 to 5, on the basis that the first sections of pipe have already been laid, forming a continuous section 120 extending into the sea from the pipe laying vessel, and using the pipe sections pre-fitted with sleeves as described in the previous paragraph:

1) Lower continuous section 120 of pipe (further) into the sea to allow the next pipe section 110 to be fitted;
2) Clean the mating surfaces of the protruding sleeve using, for example, compressed air;
3) Lower a swaging tool 170 into the sleeve until adjacent the lowermost sealing portion 106 of the sleeve, corresponding to lower overlap region 166 between liner and sleeve, then radially expand the sleeve onto the liner. (FIG. 3, Step 1);
4) Lower the next pipe section 110 onto the protruding sleeve until the two ends of the steel pipes abut;
5) Perform a preliminary weld 180 ("root pass" and "hot") of the two pipes together (FIG. 4, Step 2);
6) During performing of the cooler phase of the welding ("weld fill" and "cap"), swage the intermediate portion 109 of the sleeve, in a manner that forces any fluid trapped in the region behind the weld past the as yet unswaged region(s) (FIG. 4, Step 3);
7) Swage the uppermost sealing portion 108 of the sleeve (FIG. 5, Step 4), or if not performed earlier, swage both overlap regions of the sleeve, to form in each case a seal between sleeve and liner;
8) Perform any validation steps, such as non-destructive testing;
9) To continue laying further pipe, repeat the process from step 1.

Note that the weld surfaces are maintained in alignment with respect to each other during this process by the field proven interconnection equipment, rather than by using internal clamps. Furthermore, the welding process used is typical for S-lay and J-lay pipe laying methods currently in use, allowing plastic lined pipes to be used commercially for subsea pipe laying. In J-Lay Systems, where the pipe is suspended almost vertically during the jointing process, the pre-fitting of the bridging sleeve 102 ensures that the sleeve will not slide down the bore of the pipeline. The skilled reader will appreciate that the alternative means can be employed, if pre-fitting is not convenient. For example, a removable plastic collar could be provided around the intermediate portion of each bridging member, holding it in the mouth of the suspended pipe, until it has been sealed to the liner.

Connecting Process—Second Embodiment

Figure 6A:
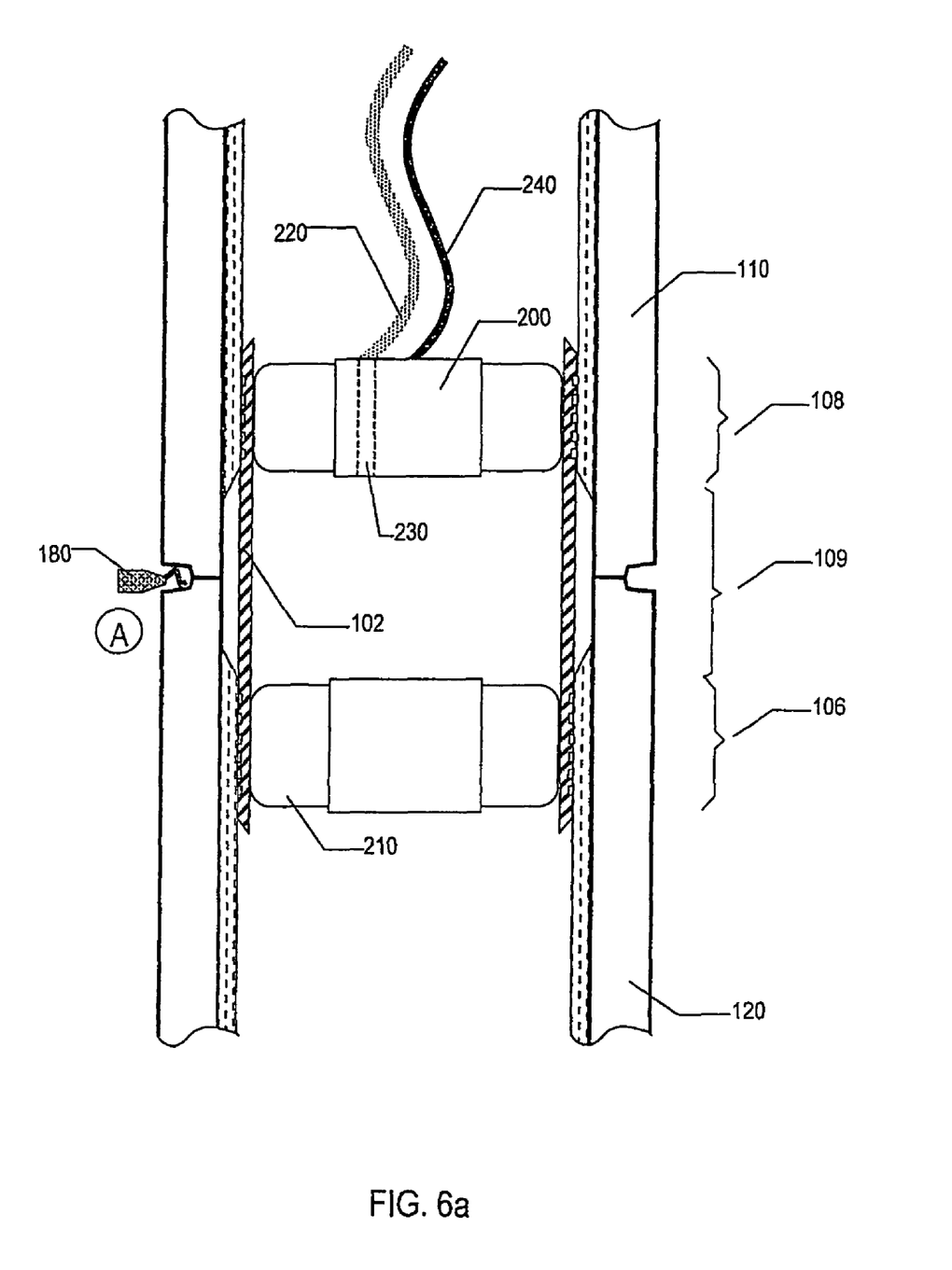
FIGS. 6*a* and 6*b* show a connecting process according to a second embodiment, using a bridging sleeve of the same form as that shown in FIG. 2.
Figure 6B:
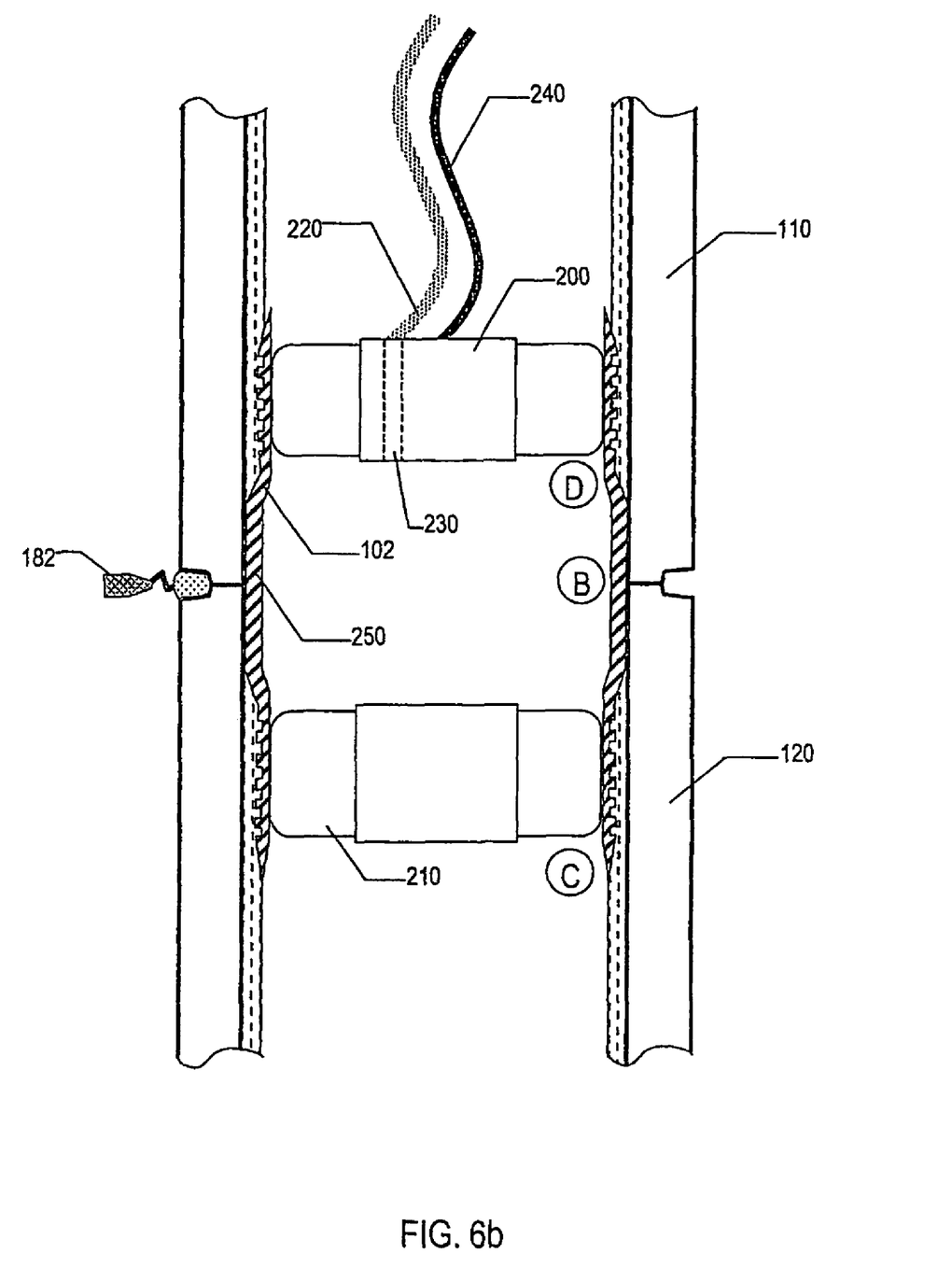

FIGS. 6a and 6b show an alternative joining process, suitable for use with the interconnection method and apparatus.

Instead of a swaging tool being lowered into the sleeve 102 after it has been installed in the pipeline, as described previously, here the sleeve and swaging tool are lowered into the pipeline as a single entity. Also, instead of a single swaging tool being radially expanded and moved longitudinally between lower and upper sealing portions 106, 108 and intermediate portion 109 portions, there are two separate swaging tools 200, 210 physically interconnected (not shown), each positioned adjacent the upper and lower sealing portions. These can be activated with a restricted pressure to grip the sleeve, without expanding it. To effect swaging, all that is required is radial expansion of the swaging tools, eliminating the requirement for drawing the swaging tool along each sleeve sealing portion. A further difference to the previous process is that while the swaging tools are expanded, a seal is formed between them. This is used to facilitate expansion of the intermediate 109 portion, by injecting fluid such as water via pipe 220 through a port 230 in the upper swaging tool 200 into the region between the tools, thus generating an expansion pressure. The gripping is also used as a means of transporting the bridging member to the location of the joint. (Fluid or other power supply to the swaging tools 200, 210 is not shown in this schematic representation)

FIG. 6b shows the liner after fluid expansion of the intermediate portion has been performed and the upper and lower swaging tools have expanded their corresponding regions. Once all swaging has been performed the internal fluid pressure is reduced and the swaging tools are retracted and withdrawn from the pipe, leaving behind a sleeve similarly shaped to that in FIG. 5, swaged by the alternative process.

Pipe interconnection in the embodiment of FIGS. 6a and 6b is consequently achieved in accordance with the following procedure, on the basis that the first sections of pipe have already been joined, forming a continuous section 120 extending into the sea from the pipe laying vessel:

1) Lower continuous section 120 of pipe (further) into the sea to allow the next pipe section 110 to be fitted;
2) Clean the mating surfaces of the liners and pipes using, for example, compressed air;
3) Position the next pipe section 110 such that the two ends of the steel pipes align and abut;
4) Using restricted pressure in the swaging tooling 200 to 240, grip and lower the sleeve 102 and tooling into the lined pipe section 110 until the upper and lower sealing portions locate adjacent the ends of the liners (as shown in FIG. 6a);
5) Perform a preliminary weld 180 ("root pass" and "hot") of the two pipes together (FIG. 6a, Step A);
6) During performing of the cooler phase 182 of the welding ("weld fill" and "cap") (or subsequently, if the timing for this stage is not critical), swage by fluid injection the intermediate portion 109 of the sleeve, in a manner that forces any fluid trapped in the region behind the weld past the as yet unswaged sealing portions (FIG. 6b, Step B);
7) Using full pressure in the swaging tools 200, 210, swage the lower and upper sealing portions 106, 108 of the sleeve to form in each case a seal between sleeve and liner (FIG. 6b, Steps C and D);
8) Retract swaging tools and remove tooling;
9) Perform any validation steps, such as non-destructive testing;
10) To continue laying further pipe, repeat the process from step 1.

As in the first embodiment, the weld surfaces are maintained in alignment with respect to each other during this process by the field proven interconnection equipment, rather than by using internal clamps. Furthermore, the welding process used is typical for S-lay and J-lay pipe laying methods currently in use, allowing plastic lined pipes to be used commercially for subsea pipe laying. In J-Lay Systems, where the pipe is suspended almost vertically during the jointing process, the swaging tool (which also carries the bridging member in the pipe) can be suspended from the top of a pipe lay tower or ramp, and advanced and retracted by unreeling and winching in the tether 240. The fluid pressure for expanding the intermediate portion 209 can be contained within an expanding bladder, rather than contained entirely by the seals formed between the swaging tools 200, 210 and the inside of the bridging sleeve.

In a variation of the second embodiment, the welding can begin even before the bridging sleeve is located behind the joint. This may be desirable for reasons of speed, for example, but otherwise brings no particular advantage. It must be ensured in this case that the plastic liner does not deform in the heat of welding, so as to prevent insertion of the bridging member.

In both embodiments, the skilled person will appreciate that the individual steps of swaging can be deferred until the most appropriate stage in the process, and as such are not rigidly bound to the order provided above. In all embodiments, however, the form of the bridging sleeve, and the sequence of operation, combine to ensure that there is space, not bridging sleeve material, at the back of the weld during the initial passes. In general, it will be seen that the bridging sleeve proposed herein allows a much greater degree of choice in the sequence of assembly, compared with the sleeves proposed in U.S. Pat. No. 6,226,855.

Finally, note that the internal diameter of the join between pipes is not significantly reduced by the method, allowing pigs, for example, to travel the pipeline relatively unhindered. The internal diameter of at least the conduit may be increased at its end, so as to substantially maintain the bore of the liner at the joints, after expansion of the bridging member.

The skilled reader will appreciate that numerous variations are possible within the principles of the apparatus described above. Accordingly it will be understood that the embodiments illustrated herein are presented as examples to aid understanding, and are not intended to be limiting on the spirit or scope of the invention claimed.

The invention claimed is:

1. A method of joining plastic-lined conduits comprising the following steps, not necessarily in the following order:
    providing a first conduit and a second conduit, each conduit comprising a wall of metal defining a bore having an open end for connection and being substantially lined by a plastic liner, the liner ending within the bore to leave a short unlined section at the open end of the conduit;
    arranging said first and second conduits with their ends abutting;
    welding said ends together to form a longer conduit;
    providing a tubular bridging member of corrosion-resistant material dimensioned to fit inside the lined conduits, the bridging member having a first sealing portion toward one end thereof and a second sealing portion toward the second end, said sealing portions being interconnected by an intermediate portion, the length of said intermediate portion being sufficient to bridge the unlined portions of the abutting first and second conduits while the first and second sealing portions overlap said liners within the first and second conduits respectively;
    with the first sealing portion of the bridging member located within the first conduit and overlapping the liner, expanding said first sealing portion radially so as to press the first sealing portion against the liner to form a first seal between the liner and the bridging member; and
    with the second sealing portion of the bridging member located within the second conduit and overlapping the liner of the second conduit, expanding said second sealing portion radially so as to press the second sealing portion against the liner to form a second seal between the liner and the bridging member, whereby the liners, the first and second seals and the bridging member form a continuous barrier between the interior bore of the lined conduits and the metal of the conduit walls, wherein the dimensions of the bridging member and the sequence of the method steps are such as to insure that there is space between the material of the bridging member and the inside of the abutting ends of the conduits during at least an initial pass of said welding step; and
    at a time after said initial pass of said welding step, after introducing the bridging member at the location of the abutting ends but before expanding at least one of the first and second sealing portions, expanding said intermediate portion of the bridging member radially so as to substantially eliminate any gap between the bridging member and the inside of the abutting ends of the conduits;
    whereby there is produced a plastic-lined conduit for use in offshore oil and gas operations capable of withstanding corrosion and elevated temperatures and pressure.

2. A method of joining plastic-lined conduits as claimed in claim 1, wherein the ends of the lined conduits are brought together before the bridging member is introduced to the said conduits at the location of the abutting ends.

3. A method of joining plastic-lined conduits as claimed in claim 1, wherein, after at least an initial pass of welding has been performed between said conduits, the bridging member is installed via the said second conduit and subsequently expanded to form a seal between the lining of each said conduit and the bridging member.

4. A method of joining plastic-lined conduits as claimed in claim 1, wherein the bridging member is located adjacent the abutting ends of the conduits prior to starting said welding step, the outer diameter of the bridging member being sufficient to leave a substantial gap between said conduit bore at said short unlined section and said bridging member.

5. A method of joining plastic-lined conduits as claimed in claim 1, wherein at a time before the ends of the first and second conduits are brought together the bridging member is fitted to the first lined conduit and the first sealing portion is expanded to form said first seal, with said second sealing portion and part of the intermediate portion remaining outside the first conduit.

6. A method of joining plastic-lined conduits as claimed in claim 1, wherein the expanding of said intermediate portion is performed prior to expanding the first and second sealing portions, to allow escape of any fluid trapped in said gap.

7. A method of joining plastic-lined conduits as claimed in claim 1, wherein the expanding of any of said intermediate portion and first and second sealing portions is performed concurrently with subsequent passes of welding.

8. A method of offshore pipeline fabrication and laying, comprising the joining of first and second conduits by the repetition of the sequence of steps as claimed in claim 1 to produce a continuous pipeline, each conduit being a section of pipeline added in turn to the pipeline being laid.

9. A method of offshore pipeline fabrication and laying as claimed in claim 8, wherein said first conduit is the pipe section joined already to the pipeline and the second conduit becomes the first conduit after the second conduit has been interconnected with the first conduit.

10. A method of offshore pipeline fabrication and laying as claimed in claim 8, wherein said first conduit is the one being added to said pipeline and the second conduit becomes the first conduit after interconnection.

11. A method of offshore pipeline fabrication and laying as claimed in claim 8, wherein each said section is less than 100 m long.

12. A method of offshore pipeline fabrication and laying as claimed in claim 8, wherein the joining of the conduits is performed while the first and second conduits are substantially horizontal, the assembled pipeline being bent first upwardly and then downwardly for entry into the sea.

13. A method of offshore pipeline fabrication and laying as claimed in claim 12, wherein the bridging member is introduced at the location of the abutting ends after the first and second conduits have been brought together.

14. A method of offshore pipeline fabrication and laying as claimed in claim 8, wherein the joining of the conduits is performed while the first and second conduits are inclined at an angle for entry into the sea.

15. A method of offshore pipeline fabrication and laying as claimed in claim 14, wherein the method is performed upon a J-Lay vessel and the expanding of the sealing portions of the bridging member is carried out by a swaging device mounted in the head of said tower.

16. The method of claim 1 wherein said tubular bridging member comprises a unitary piece of material.

17. The method of claim 16 wherein said material comprises a corrosion-resistant metal.

18. The method of claim 1, wherein said unlined sections of said first and second conduits have no apertures through said wall or metal prior to or after said plastic-lined conduits are produced.

19. The method of claim 1, wherein said bridging member has a substantially uniform wall thickness prior to expansion.

20. The method of claim 1 wherein the expanding of the bridging member forces said intermediate portion into said gap between said plastic liners of said first and second conduits.

* * * * *